United States Patent [19]
Doemen

[11] 3,906,320
[45] Sept. 16, 1975

[54] CONTROL OF BRUSHLESS D-C MOTORS

[75] Inventor: Benno Doemen, St. Georgen, Germany

[73] Assignee: Papst-Motoren KG, St. Georgen, Germany

[22] Filed: Oct. 23, 1973

[21] Appl. No.: 408,781

[30] Foreign Application Priority Data
Oct. 27, 1972  Germany............................ 2252728

[52] U.S. Cl. ................ 318/331; 318/138; 318/254; 318/341
[51] Int. Cl. .............................................. H02p 5/06
[58] Field of Search ........... 318/341, 254, 331, 138, 318/328

[56] References Cited
UNITED STATES PATENTS

| | | | |
|---|---|---|---|
| 3,440,506 | 4/1969 | Krestel et al...................... | 318/254 |
| 3,531,704 | 9/1970 | Uemura et al...................... | 318/328 |
| 3,716,769 | 2/1973 | Brunner.............................. | 318/138 |

*Primary Examiner*—Robert K. Schaefer
*Assistant Examiner*—John J. Feldhaus
*Attorney, Agent, or Firm*—Flynn & Frishauf

[57]  ABSTRACT

To control the operation of brushless d-c motors, in which armature coils are pulse-energized, a signal representative of voltage induced in the armature coils is obtained, this signal is separated into its a-c and its d-c components and the a-c component is inverted to derive an inverted 180° out-of-phase signal. The timing of the energization of the motor windings is controlled, with respect to angular position of the rotor, by the inverted a-c signal component, and the extent, or pulse width, or pulse duration of the energization is controlled in dependence on the d-c component.

19 Claims, 10 Drawing Figures

CONTROL OF BRUSHLESS D-C MOTORS

CROSS REFERENCE TO RELATED APPLICATIONS

U.S. Ser. 363,290, filed May 23, 1973, MULLER, "Collectorless d-c Motor"; and

U.S. Ser. 363,291, filed May 23, 1973, MULLER, "Axial Air Gap, Collector-less d-c Motor".

The present invention relates to control of the energization circuit for a brushless d-c motor, and more particularly to the type of d-c motor described in the cross-referenced U.S. Pat. applications Ser. 363,291 and 363,290, assigned to the assignee of the present application, the disclosure of which is deemed to be incorporated herein for a full understanding of the basic principles of the operation and construction of the motors.

Motors, as described in the foregoing applications, utilize a permanently magnetized rotor. The motors are pulse-energized, so that the torque generated will be intermittent, that is, there will be torque gaps. The motor itself is so constructed that magnetic energy is stored in the motor during generation of a torque by the energization windings, this stored magnetic energy being relesed to provide driving torque during the intervening gaps of energization of the windings.

Motors, as disclosed in the foregoing applications, substantially simplify the construction of brushless d-c motors, as well as of the associated circuitry necessary. Motors which had previously been proposed, for example as described in Siemens-Zeitschrift 1966, pp. 690–693 (publication by "Siemens") require four separately controlled windings in order to generate a rotating field. To control energization of these four windings, two Hall generators and at least four power transistors are needed. The motors in accordance with the foregoing applications, and in accordance with the present invention, require only two separate windings, a single Hall generator, and only two power transistors.

The aforementioned literature reference discloses a speed control circuit for the motor utilizing a half-wave rectifier, which derives a voltage from the four windings. Since the voltage is derived from four windings, the remaining waviness of the so derived voltage is comparatively small with respect to the average value of the voltage itself, so that it can easily be used as a control signal. Motors of the type described in the aforementioned applications, however, have differently induced voltages in the windings. The circuit, as described in the literature reference, thus cannot readily be used, since connecting a half-wave rectifier provides an output voltage with a high a-c content, not suitable for control purposes. If speed control of a motor is attempted in which the control signal has a high a-c component, at a frequency which is sufficiently low so that it could be followed by the motor, then a speed control circuit would analyze the a-c component of the speed control signal in the same way as a speed variation of the motor itself. The speed control circuit would thus have the tendency to counteract simulated speed variations, as indicated to the circuit by the waviness, or a-c component of the control signal.

It is an object of the present invention to provide a motor-speed control combination, suitable for the simplified motors of the above-identified, and cross-referenced applications, which is simple, effective, and provides for efficient utilization of the electrical energy by the motor.

SUBJECT MATTER OF THE PRESENT INVENTION

Briefly, a signal is derived representative of voltage induced in the motor windings, which is rectified, and the signal is separated into its a-c and d-c components. The a-c component is then phase-shifted by 180°, or inverted and the inverted a-c component is utilized to control the timing of application of energy pulses to the motor windings. The duration of the pulses, that is, the pulse width, is controlled in dependence on the d-c component. The d-c component can be compared with a reference voltage, for example, controlling a predetermined speed of the motor, so that the windings of the motor are energized when the d-c component level exceeed a predetermined reference, at the time (with respect to angular position of the rotor) determined by the inverted a-c component.

The information contents in the induced voltage — d-c and a-c components — are therefore separately utilized as control parameters. The inverted a-c component, in operation, is practically invariant and is only utilized to connect the windings at the proper time (with respect to angular rotor position) to operating voltage. It is not necessary to highly filter the d-c components, and the control system including the motor will respond rapidly to changes in motor speed.

Various circuits may be used to invert the a-c component; two examples will be described. The motor-control system combination required only simple inexpensive components and thus a speed-control d-c motor can be constructed which is inexpensive and still provides highly regulated, uniform output rotational energy at a predetermined speed. This is true, particularly, if the supplied torque, at a given speed, is substantially constant. This operating condition pertains in many applications.

The invention will be described by way of example with reference to the accompanying drawings, wherein.

Figure 1:
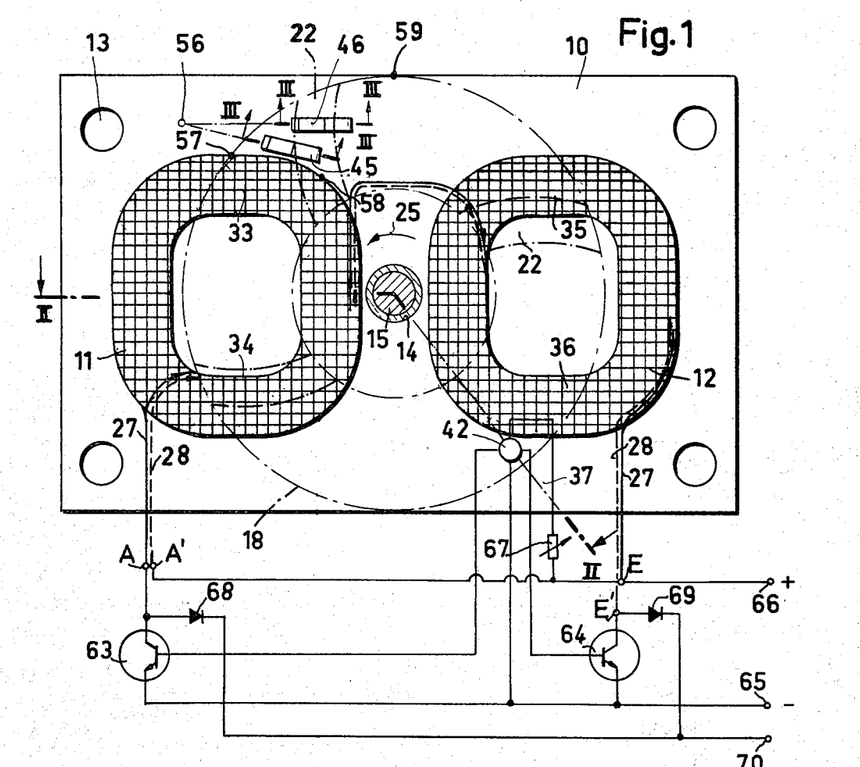
FIG. 1 is a partly schematic cross-sectional view through a motor, taken along line I—I of FIG. 2 and a partly schematic electrical circuit diagram of the energization circuit for the motor windings.
Figure 2:
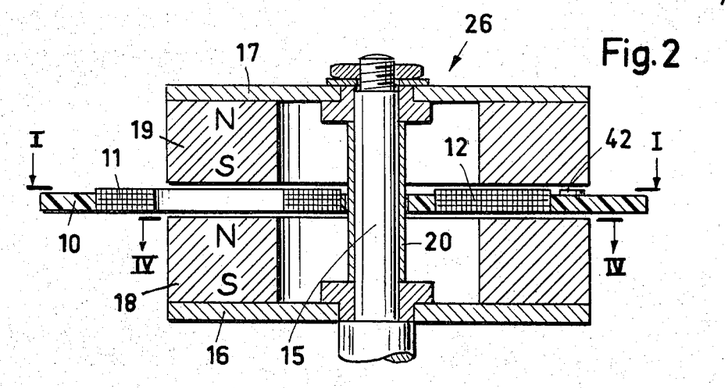
FIG. 2 is a longitudinal cross-sectional view taken along line II—II (which is angled at 120°) of the motor of FIG. 1.
Figure 4:
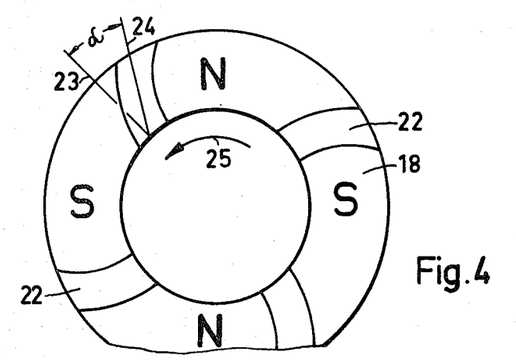
FIG. 4 is a schematic top view of a portion of a four-pole permanent magnet rotor for use in the motor of FIGS. 1 and 2, and viewed along lines IV—IV of FIG. 2; the scales of FIGS. 1, 2 and 4 are different.

A plate 10, of insulting material (FIG. 1), is formed with openings therein, in which two coreless flat coils 11, 12 are secured. The coils 11, 12 are located diametrically opposite each other with respect to a central opening 14 through which a shaft 15 extends. The plate 10 has four attachment holes 13 and carries, in addition to the coils 11, 12, further circuit elements of the motor, and its control system. As seen in FIG. 2, the shaft 15 extends through a spacer bushing 20, to which a pair of soft iron discs 16, 17 is secured, and held in precisely spaced relationship. Axially polarized ring magnets 18, 19 are secured to the soft iron discs 16, 17. The form of the polarization of the magnets 18, 19 is seen in FIG. 4, which illustrates the magnet 18; the polarization of magnet 19 is the mirror image thereof. The pole gaps 22 do not extend radially outwardly, but rather extend under an angle $\alpha$ with respect to an imaginary radius vector 23, passing through any one of the gaps 22. The approximate direction of the longitudinal axis of a gap 22 is shown at 24 (FIG. 4). The rotor 26 essentially comprises the discs 16, 17, the magnets 18, 19, and bushing 20, attached to the associated shaft 15. It rotates in direction of the arrow 25 (FIGS. 1 and 4). As seen in FIG. 4, the magnetization gaps 22 are curved counter the direction of rotation. The preferred form of the magnetization, as illustrated in FIG. 4, further shows that the magnetization gaps 22 are curved. A schematic representation of the magnetization gaps is likewise shown in chain-dotted lines in FIG. 1.

The flat or pancake coils 11, 12 are secured in suitable openings formed in the plate 10. As illustrated in FIG. 1 — schematically — both coils 11 and 12 are formed of two parallel conductors 27 (solid line) and 28 (broken lines) to form two separate winding conductors. Such a winding is also referred to as a bifilar winding. Tracing conductor 27: terminal A, the end terminal of coil 11, then in counter-clockwise direction through coil 11; connection to coil 12, and in counter-clockwise direction in coil 12 to end terminal E. Each coil 11, 12, has a plurality of windings. Tracing conductor 28: parallel to conductor 27, from terminal A', in counter-clockwise direction through coil 11, connection to coil 12, and in counter-clockwise direction to end terminal E'.

A Hall generator 42 is secured adjacent coil 12, located on a radius vector 37 which is offset approximately 90°electrically (45°mechanically) with respect to a central diametrical connection line of the two coils 11, 12.

Figure 3A:
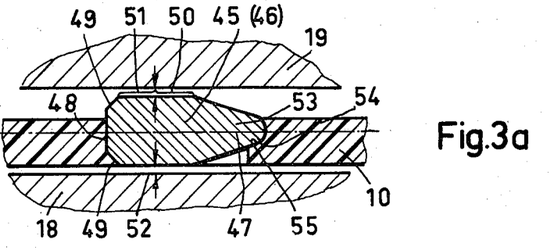
FIG. 3a is a cross-sectional view taken along lines III-—III of FIG. 1, to an enlarged scale.

Two ferromagnetic elements 45, 46 are located adjacent each other, spaced by a gap from each other at the side of coil 11 counter the direction of rotation. The gap between the magnetic elements 45, 46 is free of ferromagnetic material. The shape of these elements 45, 46, which are identical, is clearly seen in FIG. 3a. They are symmetrical with respect to their longitudinal axes 47 (FIG. 3a). The blunt end 48, closest to the direction of rotation, is chamfered as seen at 49. The adjacent section 50 has constant thickness. Both sides of the ferromagnetic element 45, or 46, respectively, are spaced from the magnets by air gaps 51, 52. It is almost impossible to make these air gaps 51, 52 to be exactly identical, even with accurate careful assembly. By suitable arrangement of the elements 45, 46, and suitable shaping thereof, the results of such dissymetry can be essentially avoided. The motor thus will run more quietly. A wedge-shaped section 53 is joined to the section 50, section 53 being rounded at the tip, which can fit into a suitable similar hollow recess 55 in plate 10. The lower side of the elements 45, 46 preferably are flush with the lower side of plate 10, as clearly seen in FIG. 3a.

Figure 3B:
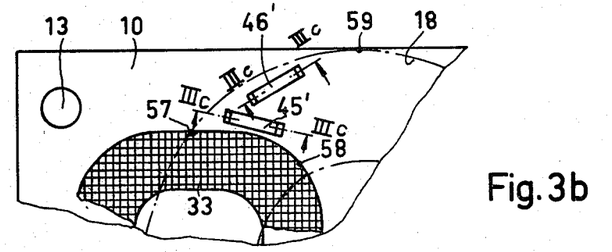
FIG. 3b is a fragmentary view similar to FIG. 1, and illustrating a modification of the energy storage system of FIG. 1.
Figure 3C:
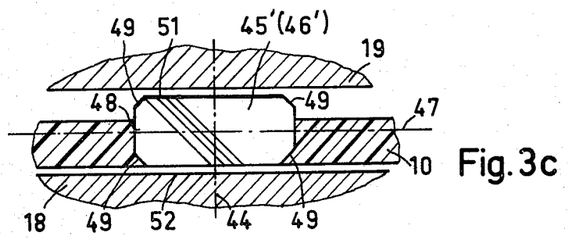
FIG. 3c is a cross-sectional view taken along lines IIIc—IIIc of FIG. 3b.

FIGS. 3b and 3c show a different arrangement. Ferromagnetic elements 45', 46' have essentially the same operating effect as elements 45, 46 of FIGS. 1 and 3a; similar parts have been given similar reference numerals and will not be described again. The arrangement of FIGS. 3b, 3c also has the desirable advantages of quiet operation even if dissymmetry in air gaps exists. The angular position of the parts 45', 46' with respect to each other is slightly different. In FIG. 3b, the angle between the elements 45', 46' is approximately 30°to 50°. The longitudinal axes of elements 45, 46 (FIGS. 1, 3a), or 45', 46' (FIGS. 3b, 3c) intersect in such a way what the tip 56 of the intersecting angle (FIG. 1) is directed towards the direction of rotation as indicted by arrow 25. It is thus possible to locate these two elements within an imaginary spherical triangle having corners 57, 58, 59, in which the corners 57, 58 are located at the edges of coil 11 and the corner 59 is located on a chain-dotted circle which corresponds to the outer edge of the ring magnet 18, 19, respectively. The volume of ferromagnetic substance, that is, the volume of these elements, which are present to store magnetic energy, thus decreases in the direction towards the tip point 59 of this triangle. The aforementioned cross-referenced applications disclose other shapes and arrangements of ferromagnetic particles and provide detailed explanation. The shape of elements 45', 46', respectively (FIGS. 3b, 3c) is obvious from the drawings.

The gaps 22 in magnetization of the rotating magnets 18, 19 (FIGS. 1, 4) are approximately perpendicular to the magnetically active coil portions 33, 36, respectively, of the coils 11, 12. They are practically parallel to the magnetically active coil portions 34, 35 of coils 11, 12, respectively. As discussed in the aforementioned cross-referenced applications, this enables locating the ferromagnetic elements adjacent to, and not over or beneath the coil 11, since the gaps 22 will simultaneously interact with the magnetically active coil portion (for example 33) as the rotor 26 rotates, as clearly apparent from FIG. 1.

Current through the conductors 27, 28 is controlled by two transistors 63, 64 (FIG. 1). The emitter of each transistor is connected to the negative terminal 65 of a d-c source, the positive terminal of which is indicated at 66. The collector of transistor 63 is connected to terminal A of conductor 27. The collector of transistor 64 is connected to the terminal E' of conductor 28. Terminals A' and E are connected to the positive terminal 66 of the d-c source. The base of transistor 63, as well as the base of transistor 64 is, respectively, connected to a control output of the Hall generator 42. The Hall generator 42 has its two other terminals connected to negative terminal 65 of the d-c source on the one hand and on the other to the positive terminal 66 over an adjustable control resistance 67.

Figure 5:
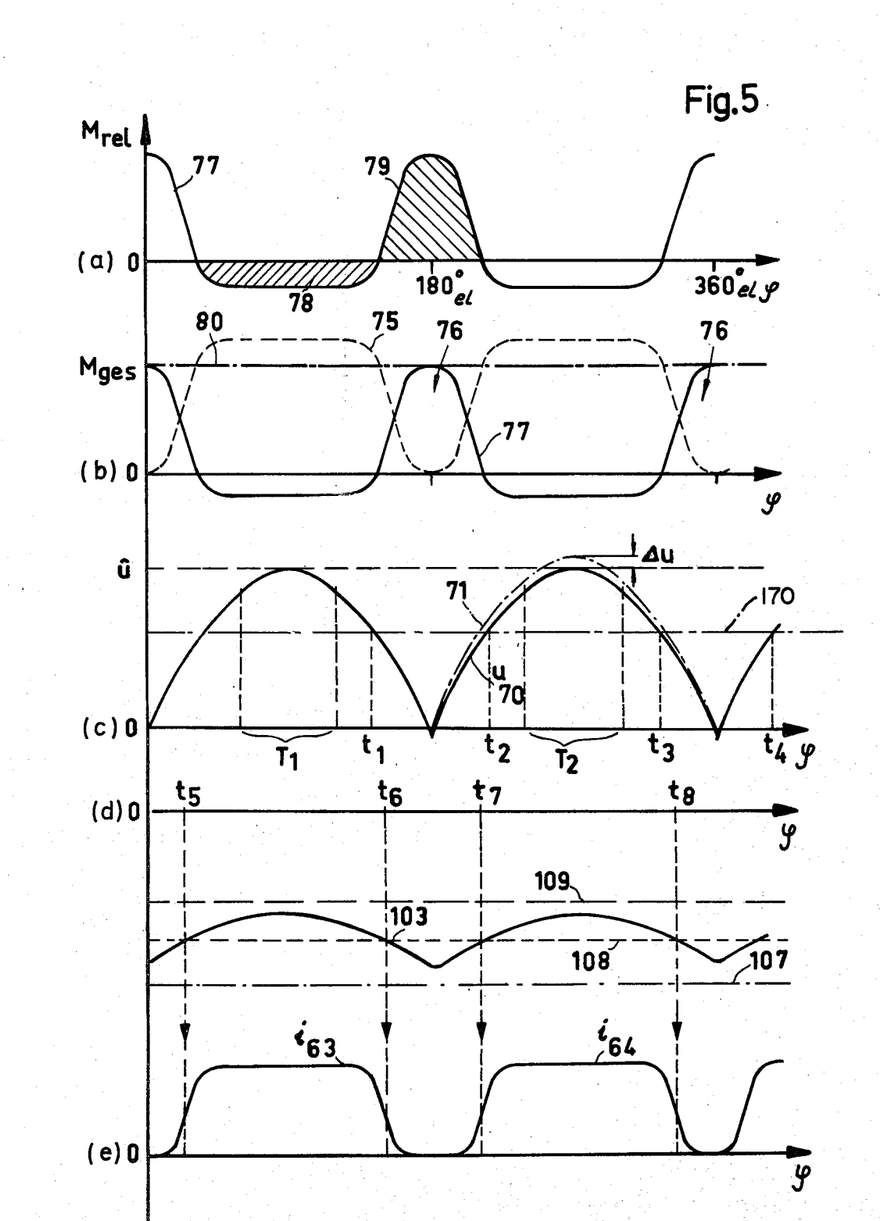
FIG. 5 is a series of graphs, with respect to motor angular position, or time, respectively, and illustrating torque and voltage relationships arising during operation of the motor.

Operation of the motor and the system of FIG. 1, with reference to FIG. 5: The second line, graph b, of FIG. 5 illustrates (dashed curve 75) the torque generated by current flowing through conductors 27, 28, respectively, upon rotation of rotor 26. As is clearly apparent, torque gaps will arise during the rotation of the rotor. These gaps are shown at 76 in graph b of FIG. 5. These torque gaps are undersirable since, under worst operating condition, they may inhibit starting of the motor, and, during operation, cause uneven operation of the motor itself.

The ferromagnetic elements 45, 46 or 45', 46', respectively, store magnetic energy. This stored magnetic energy provides an additional reluctance torque, which is illustrated in FIG. 5, graph a, and graph b, by curve 77. The reluctance torque generated by these elements is non-symmetrical. The area 78 (graph a) corresponds to the area 79 (disregarding losses). The lower portion of the graph, that is, the graph below the zero or null line and represented by the section 78 represents a braking torque; the upper area 79 represents a positive, that is, a driving torque. The overall torque generated by the coils (curve 75, graph b) and the reluctance torque (curve 77) is indicated in graph b by chain-dotted line 80. This composite or summed torque is obtained by superposing the torque curves 75, 77. By suitable dimensioning of the ferromagnetic elements, the coils, and energization, the entire torque can be held practically constant over the entire rotational angle of the rotor.

By forming the windings 11, 12 of two parallel conductors, rotor 26 will have a practically symmetrical torque applied thereto, so that the bearings of the rotor will not be loaded with unsymmetrical forces. Further, the axially acting magnetic forces will likewise be symmetrical, and the operating noise of the motor will thus be very low.

Connecting a diode 68 to the collector of transistor 63 and a diode 69 to the collector of transistor 64, and joining the cathodes of the diodes together at junction 70 provides a signal output of a voltage $U_{70}$ at this junction which has a wave shape illustrated in the next row (graph c) of the graphs of FIG. 5. This voltage has an average, or rms value which is proportional to the speed of the motor. The wave shape itself is that of a full-wave rectified voltage. It has a d-c and a high a-c content. If transistor 63 would switch only coil 11, and transistor 64 would switch only coil 12, and diodes 68 and 69 would be responsive to the induced voltage then, upon dissymmetries in the motor construction, voltages induced in the various coils may be highly unsymmetrical. These dissymmetries, particularly different amplitudes, are seen in FIG. 5, graph c, by the chain-dottet line 71, which shows a difference voltage $\Delta U$ of one voltage which is higher than the maximum voltage $ú$. A control circuit, in which the induced voltage $ú$ is different by an amount $\Delta U$ from the induced voltage in the other coil would require additional circuitry in order to smooth out, and eliminate such differences. Unsymmetrical response or unsymmetrical control voltages from different coils are highly undesired in control circuitry. Such smoothing or damping circuits, or additional circuits to counteract such dissymmetries are difficult to construct, since the dissymmetries will have the same low frequency as the switching frequency of one of the transistors 63 or 64, that is, the operating frequency of the motor. The control voltages $U_{70}$, which are derived from the induced voltages of essentially the same amplitude, however, have a higher base frequency, that is, twice as high as the frequency of the difference voltage $\Delta$. This higher frequency can be brought to an even level much easier. By arranging the windings as shown, the voltages are induced in both coils 11, 12, and thus the overall output signal obtained will follow curve $U_{70}$ and the induced voltage waves will be effectively uniform, so that they can be directly utilized for control purposes.

The induced voltage $U_{70}$, in accordance with the system of the present invention, although cyclically effectively uniform, has a high a-c content. This waviness, or undulation of the control voltage is not suitable for speed regulation with ordinary speed controllers, which can readily be understood from this consideration:

A common speed controller is so designed that the current in the motor is connected, or increased, if the voltage, depending on speed, and connected to its input, has dropped below a predetermined value; in other words, the actual value of the voltage has dropped below the command value. A d-c command level is indicated by chain-dotted line 170. This is the case in the voltage $U_{70}$ (FIG. 5, graph c) between time $t_1$ and $t_2$, as well as between time $t_3$ and $t_4$ (and in subsequent cycles). A conventional or ordinary speed controller thus would apply current to the motor to be controlled between the time periods $t_1$ and $t_2$, and again between $t_3$ and $t_4$. As can readily be seen from FIG. 5, the motor in accordance with the present invention requires energization, that is, supply current, at entirely different points in time (with respect to angular position of the rotor), that is, between the time $t_2$ and $t_3$ when the voltage is a maximum and above line 170. This is readily apparent when considering the torque curve 75 in graph b of FIG. 5, since only during that time will current carrying conductors be within the magnetic field, with which the current is to interact. Efficiency requires that current flow in the motor windings preferably at such time when the induced voltage $U_{70}$ is in the region of its maximum. These maximum regions are illustrated in FIG. 5, graph c, by $T_1$ and $T_2$. A conventional controller, however, reduces current to the motor in just those time periods $T_1$, $T_2$, or cuts off the current entirely, since these voltage peaks simulate to the controller that the speed of the motor to be controlled is above the command value (line 170). In other words, a conventional controller is misled by the phase position of the control signal, and would connect operating energy at the wrong period of time.

According to the invention, by inverting the control curve $U_{71}$, the maxima of curve $U_{70}$ above line 170 will occur at the time when no current is required anyway. The portions of the curve below line 170 will, however, include the time periods $T_1$ and $T_2$.

Figure 6:
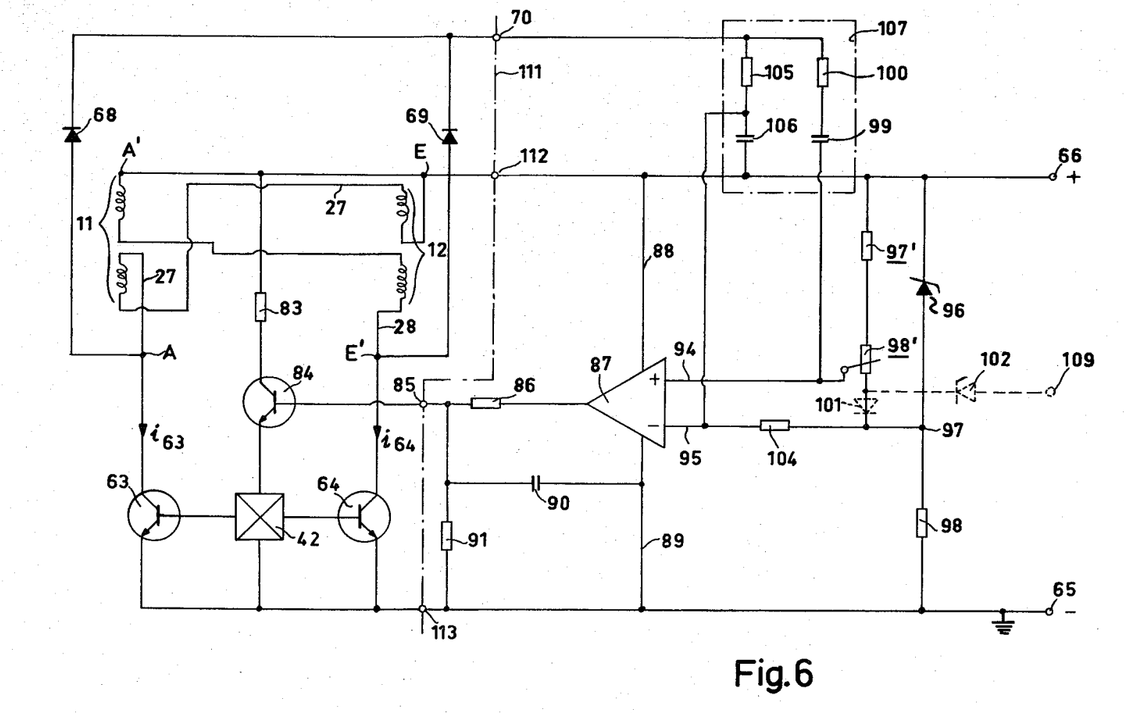
FIG. 6 is a schematic circuit diagram of a control circuit in accordance with the present invention.

The circuit of FIG. 6, in accordance with the present invention, solves this problem and provides for high quality control and speed regulation.

The circuit of FIG. 6 is basically similar to that of FIG. 1, and similar parts having similar opeating effects will be given the same reference numerals. Hall generator 42 is connected to positive line 66 in FIG. 1 over a variable resistance 67. This variable resistance 67 is replaced by the circuit of FIG. 6 by a fixed resistor 63 in series with the controllable resistance of the emitter-collector path of a transistor 84. The base of transistor 84 is connected to a junction point 85 and then over a resistor 86 to the output of an operational amplifier 87. Operational amplifier 87 receives operating potential from positive bus 66 over a line 88, and is connected to negative bus 65 over line 89. Amplifier 87 has an amplification factor in the order of 50,000. This may be too high for the purposes of the present invention. A capacitor 90 of, for example, 100 nF is connected between junction 85 and line 89 and a resistor 91 between junction 85 and negative bus 65. This resistor may have a value of, for example 1 k$\Omega$. Capacitor 90, together with the voltage divider formed by resistors 86, 91 forms an R/C circuit to prevent too rapid operation of the operational amplifier 87 (thus flattening the switchover characteristics) and thus provides for gradual, or soft turn-ON and turn-OFF of the transistors 63, 64. High-frequency disturbances which might arise are also suppressed, and the motor noise due to magnetic effects is decreased.

Amplifier 87 has two relatively inverse inputs 94, 95. The output of operational amplifier 87 becomes positive and provides base current to transistor 84 when input 94 is more positive than input 95. A Zener diode 96 provides a reference voltage. The cathode of Zener diode 96 is connected to positive bus 66; the anode is connected to a junction 97 and then over a resistor 98 to negative bus 65. If the positive bus 66 is deemed to have a voltage of 0 V, then junction 97 will have a voltage which is negative with respect to terminal 66, for example −7.5 V.

The series circuit of a resistor 97' and a potentiometer 98' is connected in parallel to Zener diode 96. The tap point or slider of potentiometer 98' is connected to input terminal 94 of the operational amplifier 87. If the motor is stationary, terminal 94 will have a voltage which is positive with respect to junction 97, and hence terminal 95. Terminal 94 of operational amplifier 87 is further connected over an R/C network formed of resistor 100 (e.g. 100 k$\mu$) and capacitor 99 (e.g. 2 $\Omega$F) to junction or terminal point 70. Capacitor 99 passes only the a-c component of voltage $U_{70}$ (FIG. 5) to terminal 94 of the operational amplifier 87. This a-c component is added to the voltage of the tap point of potentiometer 98, that is, is shifted in the negative direction, so that terminal 94 will have a voltage applied which is shown in FIG. 5, graph $d$, by curve 103. Curve 103 is an a-c voltage superimposed on a negative voltage. The absolute maxima of voltage $U_{70}$ correspond to the absolute minima of voltage 103, and vice versa.

Junction 97 is connected by means of coupling resistor (e.g. 10 k$\Omega$) to input 95 of operational amplifier 87. Input 95 is directly connected to the junction point between a capacitor 106 (e.g. 2 $\mu$F) and a resistor 105 (e.g. 100 k$\Omega$). The resistor is connected to terminal 70 and the capacitor to positive bus 66. The circuit elements 105, 106 act as a filter network which passes only the d-c component of the voltage $U_{70}$, while simultaneously having smoothing functions of this d-c component.

The circuit components 99, 100; 105, 106 provide an a-c/d-c separating network, which is formed by a combination of a series-parallel R/C network.

Operation of circuit of FIG. 6, with reference to FIG. 5: Let it be assumed that the motor is just starting, and turns slowly. The d-c component of voltage $U_{70}$ is small and the periodically varying or undulating voltage at terminal 70 only hardly exceeds the voltage of positive bus 66 (as noted above, at voltage 0 V). Resistors 105 (e.g. 100 k$\Omega$) and 104 (e.g. 10 k$\Omega$) form a voltage divider, and input 95 of operational amplifier 87 will have a voltage which is negative with respect to that of terminal 66. This voltage is shown in graph $d$ of FIG. 5 at 107. The voltage at terminal 95 is filtered by capacitor 106 and is at all times negative with respect to the voltage 103 (graph $d$ of FIG. 5) at terminel 94. The output of amplifier 87 is thus positive at all times and connects transistor 84 over resistor 86 to become conductive. The motor will start, controlled by its single Hall generator 42. Magnetic energy will be stored in the ferromagnetic elements 45, 46 in order to bridge the gaps in torque illustrated at 76, graph $b$ of FIG. 5.

When the desired nominal speed of the motor has been reaches, then the d-c component of the voltage $U_{70}$ will also reach a substantial value. The voltage at the input 95 of amplifier 87 will become more positive and reach the value illustrated at short broken line 108 in graph $d$ of FIG. 5. As seen from the graph, the voltage 108 is positive measured with respect to voltage 103 from time period 0 to point $t_5$. Transistor 84 is blocked by the negative output of the amplifier 87, and the motor will not be energized. At time $t_5$, the voltage 108 will become negative or less (in negative direction) with respect to the voltage 103, and motor current $i_{63}$ (graph $e$ of FIG. 5) will flow until time $t_6$, at which time the voltage 108 will become positive (or more highly negative, in negative direction) with respect to voltage 103, and transistor 63 will block, since Hall generator 42 will be de-energized. At time $t_7$, voltage 108 becomes negative with respect to voltage 103, and transistor 64 will be connected, causing a current $i_{64}$ to flow (see graph $e$ of FIG. 5) until time $t_8$.

The above-described cycle will repeat. If the speed increases, the shape of curve 103 will not change substantially. Line 108, however, will shift upwardly, so that the pulse width, that is, the angle during which energization of the coils will be effective, will decrease. The motor will receive less current, and hence less energy. At high excessive speeds, the d-c component may reach the level of the long broken line 109, so that no current will be supplied to the motor at all. If a braking-type load is connected to the motor, then this condition will hardly ever arise; if the load connected to the motor, however, is a driving load, then a dynamic, or other braking system may have to be used in connection with the circuit and the motor.

If the speed falls below the command speed, then the connecting phase angle will increase and speed will rise.

The motor winding thus is energized always at that point in time, or looked at from another point of view, at that point at the instantaneous angular position of the rotor, in which the induced voltage approaches its maximum, that is, at the proper time for highest motor operating efficiency.

The motor can be switched OFF, without an interrupting-type contact, by connecting a diode 101 between the potentiometer 98' and junction 97 and connecting a Zener diode 102 to the anode of diode 101. If the anode of Zener diode 102, connected to point 109, is then connected to a negative voltage of, for example, −20 V (with reference to negative bus 65), diode 101 will block and input 94 will be connected to a highly negative bias, so that the motor will be effectively disconnected from supply potential and will stop. This circuit is not strictly necessary for the purposes of the present invention and thus has been shown in dashed lines, and can be replaced by a simple ON-OFF switch connected to line 65, 66.

Temperature and voltage compensation circuits to compensate for changes in temperature, changes in supply voltages, and the like, can be connected to the circuit of FIG. 6, so that the speed of the motor will be held constant regardless of changes in ambient surroundings. The circuit can additionally be modified by providing for dynamic variation of the control signal to rapidly compensate for rapid changes in loading, as well known in connection with control circuitry.

Figure 7:
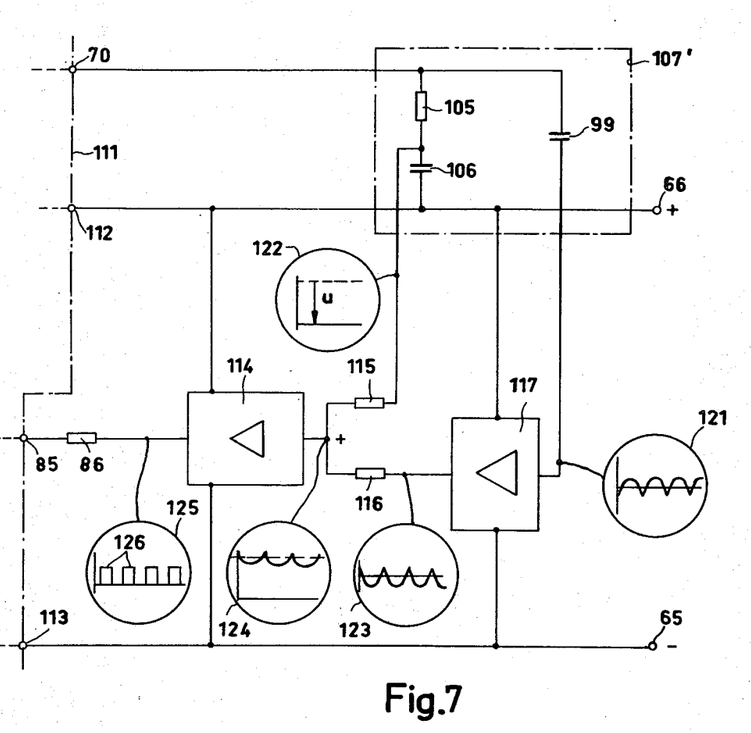
FIG. 7 is a further embodiment of the control circuit of the present invention.

Embodiment of FIG. 7: Only those parts to the right of chain-dotted line 111 of FIG. 6 are shown in FIG. 7; those parts to the left of chain-dotted line 111, at which terminals 70, 112, 85, 113 are located, are identical to those in FIG. 6 and have been omitted. Similar parts having similar operating functions have been given the same reference numerals, and wave shapes arising in various parts of the circuits have been indicated in FIG. 7 in circles.

A control amplifier 114 (FIG. 7) which, like amplifier 87 may be an operational amplifier with inverse feedback, includes a reference element such as a Zener diode. Two resistor 115, 116 are connected to the input of the amplifier 114, so that amplifier 114 operates like an adding or summing amplifier, in which two signals are superimposed. One signal is the d-c component of voltage $U_{70}$, supplied from frequency-selecting circuit 107' and taken from the tap point between resistor 105 and capacitor 106. The other summing resistor 116 has the a-c component applied thereto, connected over capacitor 99 and an inverting amplifier 117.

Operation, with reference to wave forms in circles 121–126: The a-c component of the voltage $U_{70}$ is indicated in circle 121 (compare also FIG. 5). The d-c component is indicated in the circle 122, the voltage indicated by $u$ having a direct relation to motor speed. The wave shape in circle 123 is the inverse of that of the wave in circle 121 and shows the output of the inverting amplifier 117. The 180° phase shift is clearly apparent; instead of using an inverting amplifier 117, any other phase shifting circuit which effects, effectively, 180° phase shift can be used.

Circle 124 illustrates the superimposed d-c component (circle 122) and the inverted a-c component (circle 123). The inverted a-c component (circle 123) can be thought of rising in level with respect to the circle 122 to derive a wave form in circle 124 in which the a-c component becomes more or less pronounced without change, however, in wave shape.

The superimposed, summed signal (circle 124) is compared in control amplifier 114 with a controllable reference, so that the output from amplifier 114 will be a pulse output as seen in circle 126. The pulses coincide with the maxima of voltage $U_{70}$; the width of the pulses is a function of the speed of the motor. If the speed increases, the pulse width decreases. Various other systems can be arranged, for example, the pulse width could stay the same but the pulse amplitude could decrease with increasing speed. This type of output can be obtained by suitable transposition circuits, for example connected to amplifier 114, or inherent therein.

Figure 8:
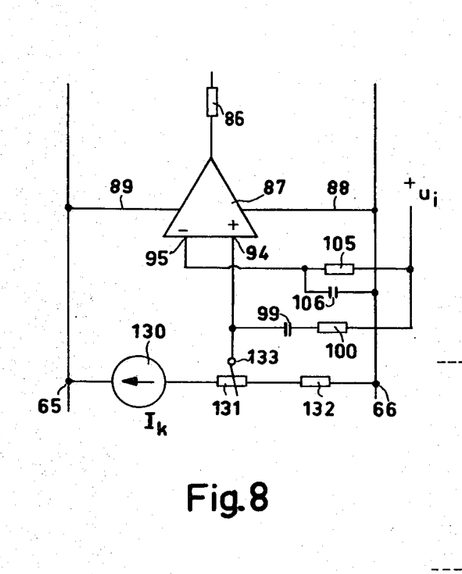
FIG. 8 is a fragmentary circuit diagram of an alternate circuit arrangement.

FIG. 8 illustrates a portion of the circuit of FIG. 6; similar parts to those of FIG. 6. have been given the same reference numerals. To shift the reference level of operational amplifier 87, a constant current source 130 is provided, connected between the negative bus 65 and an end terminal of a potentiometer 131, the other end of which is connected over a resistor 132 to positive bus 66. The tap, or slider 133 of potentiometer 132 is connected to input terminal 94 of the operational amplifier 87. The operation of this circuit is similar to that of the circuit of FIG. 6. The constant current source 130 may, for example, be a resistor if the voltage across terminals 65, 66 is accurately controlled; alternatively, it may be a transistor in a feedback circuit.

The voltages induced in the windings, by themselves, and before suitable signal processing, are not directly suitable to control a speed control network. The simple circuits of FIGS. 6, 7 (or FIG. 8) readily permit utilization of the voltages induced by a permanent magnet rotor in such a manner that the motor can be controlled to operate at predetermined, controlled speeds, at high operating efficiency.

The control circuits of the present invention are suitable for motors having a cylindrical air gap with a superimposed reluctance torque, as described in the aforementioned cross-referenced application Ser. 363,290 as well as for use with motors with axial air gaps; the principles of the control circuit can also be applied to different types of motors.

Various changes and modifications may be made within the inventive concept, and features described in connection with any one of the Figures may likewise be used, suitably, with other embodiments.

I claim:

1. Method of controlling the operation of brushless d-c motors having a rotor (26), winding means (11, 12) being pulse-energized to generate torque pulses, and means (45, 46) to store magnetic energy during generation of torque and to release the stored energy during gaps between torque pulses to provide substantially uniform torque to the rotor during rotation thereof;

comprising the steps of deriving a signal ($U_{70}$) representative of voltage induced in the motor winding means;

separating said signal into its a-c and its d-c components;

displacing the a-c component to derive a displaced signal (103) having absolute maxima and minima values which are displaced with respect to the absolute maxima and minima of said a-c component;

controlling the timing of energization of said motor winding means, with respect to angular rotor position, in dependence on said displaced a-c component;

and controlling the intensity of energization of said winding means in accordance with the d-c component.

2. Method according to claim 1, comprising the steps of generating a reference voltage signal;

comparing the d-c component with said reference voltage signal;

wherein the step of controlling the intensity of energization of said d-c motor means comprises applying a signal representative of the error between the reference signal and the d-c component to the winding means during a time controlled by said displaced a-c component.

3. Method according to claim 1, wherein the step of controlling the energization of said motor winding means comprises controlling the duration of ON-energization of said motor winding means and modifying said d-c component in accordance with a controllable signal.

4. Method according to claim 1, wherein the step of displacing the a-c component comprises inverting the a-c component to derive an inverted a-c component signal.

5. Brushless d-c motor and control circuit therefor, wherein the motor comprises
a rotor (26);
winding means (11, 12) being pulse-energized to generate torque pulses;
and means (45, 46) to store magnetic energy during generation of torque and to release stored energy during gaps between torque pulses to provide a substantially uniform torque to the rotor during rotation thereof;
and wherein the control circuit for the motor comprises
sensing means (68, 69) connected to the winding means (11, 12) sensing voltage ($U_{70}$) induced in the winding means;
means (107) separating the a-c and d-c components of said induced voltage;
means (97', 98', 117) displacing the a-c component to provide a displaced a-c signal having absolute maxima and minima which are displaced with respect to the maxima and minima of said induced voltage; and
means (84, 87) connected to and controlled (94) by said displaced a-c component signal controlling the timing, with respect to instantaneous angular position of the rotor (26) of the energization pulses applied to said winding means, and further connected to and controlled (95) by said d-c component controlling the intensity of energization of the pulses.

6. Control circuit and motor according to claim 5 wherein the displacing means comprises an inverter circuit (117) to provide an inverted a-c component signal.

7. Control circuit and motor according to claim 5, wherein the controlling means (84, 87) comprises an operational amplifier (87);
means providing a d-c voltage of equal magnitude but opposite polarity to the d-c component;
first adding means adding said d-c voltage and said a-c component and connecting said first added voltage to the first input of said operational amplifier;
means providing a control voltage of polarity opposite to the polarity of the d-c component;
second adding means adding said control voltage and said d-c component and connecting said second added voltage to an input of said operational amplifier which is inverse with respect to said first input.

8. Control circuit and motor according to claim 7, further comprising an R/C circuit (90, 91) connected to operational amplifier to prevent rapid switching of the operational amplifier and provide for smooth turn-ON and turn-OFF of the pulses to the winding means of the motor.

9. Control circuit and motor according to claim 5, wherein the means separating a-c and d-c components comprises
an R/C network (107) having at least one resistor (100, 105) and at least one capacitor (99, 106).

10. Control circuit and motor according to claim 9, wherein the R/C network comprises
a pair of parallel R/C circuits, one of said circuits being a series combination of resistance and capacitance and the other circuit being a T-network.

11. Control circuit and motor according to claim 5, wherein the means (87) controlling the energization of the winding means controls pulse amplitude.

12. Control circuit and motor according to claim 5, further comprising circuit means providing a command voltage, and means adding said command voltage to said d-c component, to shift the level thereof.

13. Control circuit and motor according to claim 12, wherein said circuit means comprises a constant current source (FIG. 8: 130).

14. Control circuit and motor according to claim 12, wherein said circuit means comprises a Zener diode circuit.

15. Control circuit and motor according to claim 5, wherein the winding means of the motor comprises two coils, each having a bifilar winding.

16. Control circuit and motor according to claim 15, wherein the sensing means comprises a multiphase half-wave rectifier, one each rectifier of a phase being connected to one of the conductors of the bifilar winding and sensing the voltage induced in the winding which does not have a current pulse flowing therethrough.

17. Control circuit and motor according to claim 5, wherein the means (84) controlling the energization of the pulse applied to the winding means controls the pulse width.

18. Control circuit and motor according to claim 5, further comprising circuit means providing a reference voltage, and means adding said reference voltage to said a-c component to shift the level thereof with respect to the induced voltage.

19. Control circuit and motor according to claim 18, wherein said circuit means comprises a Zener diode circuit.

* * * * *